UNITED STATES PATENT OFFICE.

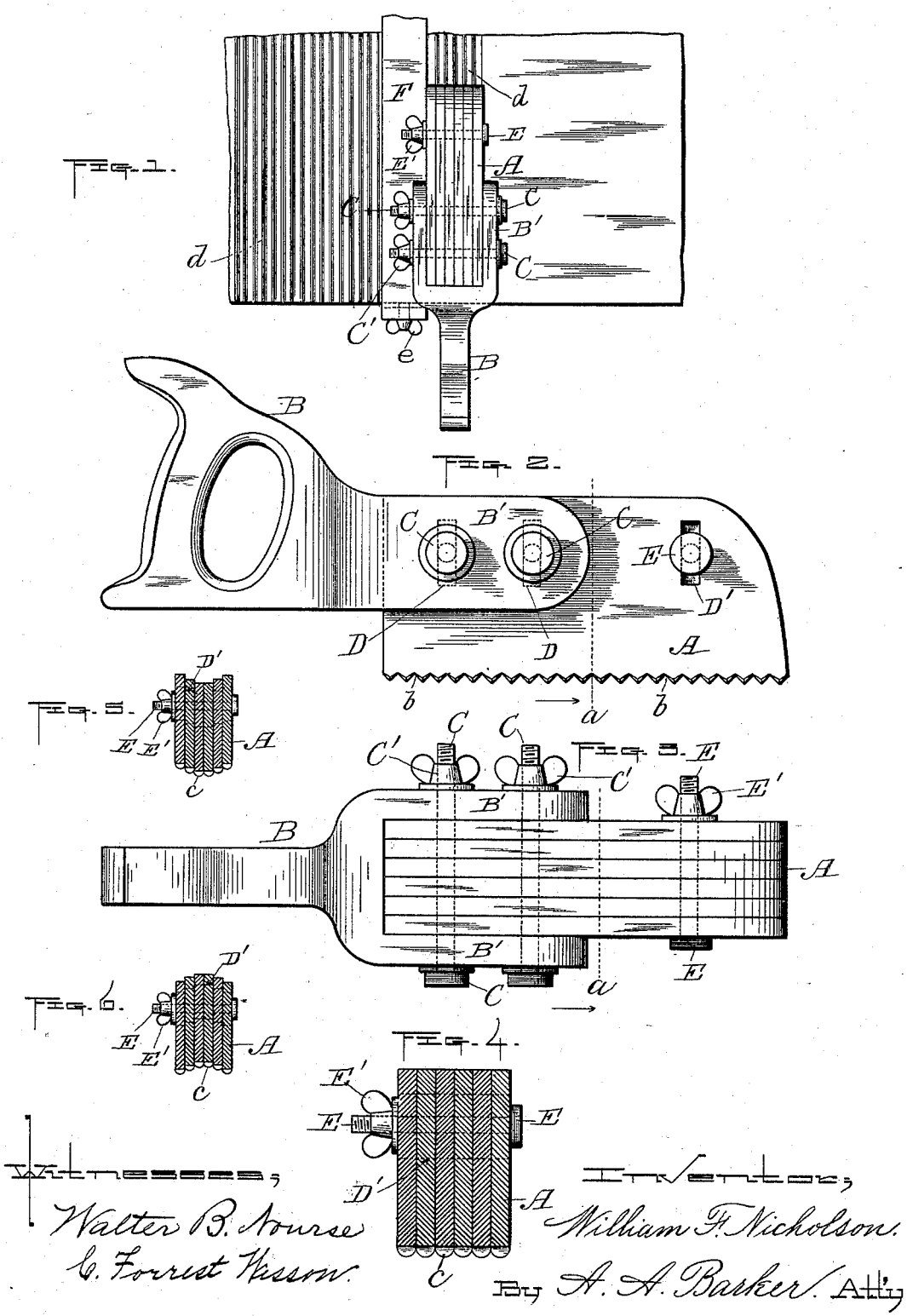

WILLIAM F. NICHOLSON, OF WORCESTER, MASSACHUSETTS.

HAND IMPLEMENT FOR TOOLING STONE-SURFACES.

SPECIFICATION forming part of Letters Patent No. 477,693, dated June 28, 1892.

Application filed February 17, 1892. Serial No. 421,864. (No model.)

*To all whom it may concern:*

Be it known that I, WILLIAM F. NICHOLSON, of the city and county of Worcester, and State of Massachusetts, have invented certain new and useful Improvements in Hand Implements for Tooling Stone-Surfaces; and I do hereby declare that the following is a full, clear, and exact description thereof, reference being had to the accompanying drawings, forming a part of this specification, and in which—

Figure 1 represents a block of stone in plan view with a gage-plate and my improved tooling implement applied thereto in position for operating upon the surface thereof, a portion of said surface being shown already "tooled," as will be hereinafter described. Fig. 2 is a side view of said tooling implement, shown upon an enlarged scale. Fig. 3 is a plan thereof. Fig. 4 is a transverse section through the blades of the implement, taken on lines $a\ a$, Figs. 2 and 3, looking in the direction indicated by the arrows in said figures; and Figs. 5 and 6 are similar views to Fig. 4 upon a smaller scale, showing modifications, which will be hereinafter described.

The object of my invention is to provide an implement or device whereby what is commonly known in the stone-cutting trade as "tooling" may be done by hand in a more expeditious and perfect manner than heretofore; and it consists of a series of metal toothed plates or blades arranged side by side and adjustably fastened in a suitable operating-handle, the teeth of the blades being curved transversely to produce similarly-shaped cutting-edges and arranged in a series of transverse lines across the bottom of the device, so as to cut longitudinal grooves in the stone when said device is drawn and pushed backward and forward with a downward pressure over the surface thereof, as will be hereinafter more fully set forth.

To enable others skilled in the art to which my invention appertains to better understand the nature and purpose thereof, I will now proceed to describe it more in detail.

In the drawings the parts marked A represent the series of toothed blades before alluded to, and B the handle, to which they are secured. Said blades, of which there are six shown in this instance, are placed side by side and are fastened to the handle by means of bolts C C and nuts C' C', said bolts being passed transversely through suitable openings in the flanges B' B' of the handle, between which the blades are arranged, and through vertical slots D D, extending transversely through all the blades, while the nuts are turned up against one side, as is shown in the drawings. The outer ends of the blades are similarly fastened by a bolt E and nut E', a slot D' being formed in the blades to receive said bolt.

The purpose of the slots D D' is to admit of the vertical adjustment of the different blades to suit the work upon which they are to be applied—as, for instance, if a concave surface is to be tooled, the blades would be adjusted to produce a convex curve transversely across the bottom of the implement, as is shown in Fig. 5, while for a convex surface the blades would be reversed or arranged in concave form on the bottom, as is shown in Fig. 6. Each blade A is notched transversely on its bottom edge in the form of saw-teeth, as is shown at $b$ in Fig. 2, and the teeth of each blade are arranged in line transversely across the whole width of the bottom of the implement or device, thus forming a series of transverse cutting-edges throughout the length of said bottom face.

In addition to cutting the teeth $b$ transversely on the bottom edge of each blade, as aforesaid, the edge of each tooth is curved in a transverse direction to the blades, so that when the blades are fastened together in the handle the lines of transverse cutting-edges are in the form of a series of convex curves or rib-shaped in outline, as is shown at $c$ in Figs. 4, 5, and 6. Said cutters being thus formed, it is obvious that by drawing and pushing the implement or device backward and forward with a downward pressure over the surface of the stone to be operated upon a series of grooves $d$ will be gradually cut therein corresponding in number and shape to the blades and the cutting-edges thereof.

It will of course be understood that I do not limit myself to the special shape of said cutting-edges or to the number, thickness, and shape of the blades upon which they are formed, different shapes and sizes being required for different work.

In practice it is preferable to use a gage-plate F at one side of the tooling implement, as is shown in Fig. 1, to guide the same in a straight line, said gage-plate being fastened to the block of stone by means of set-screws $e$, or otherwise held, as desired.

It will at once be apparent to those skilled in the art of stone-cutting that by the use of my improved hand implement tooling may be done not only very expeditiously, but also in a perfect manner, each groove being of uniform size, shape, and smoothness.

Having now described my invention, what I claim as new, and desire to secure by Letters Patent, is—

A hand implement for tooling stone-surfaces, comprising the series of blades A, placed side by side, and having curved teeth or cutting-edges on the bottom coming in line transversely, as described, and also having vertical slots extending transversely through all the blades, in combination with a suitable handle B, adapted to receive one end of the blades when bunched together, and suitable bolts and nuts for fastening the parts after adjustment, substantially as shown and specified.

WILLIAM F. NICHOLSON.

Witnesses:
A. A. BARKER,
W. B. NOURSE.